United States Patent
Pryor (10) Patent No.: US 7,517,282 B1
(45) Date of Patent: Apr. 14, 2009

(54) METHODS AND SYSTEMS FOR MONITORING A GAME TO DETERMINE A PLAYER-EXPLOITABLE GAME CONDITION

(75) Inventor: Leon Pryor, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 319 days.

(21) Appl. No.: 10/633,816

(22) Filed: Aug. 4, 2003

(51) Int. Cl.
*G06F 17/00* (2006.01)
*G06F 19/00* (2006.01)

(52) U.S. Cl. .............................. 463/42; 463/1; 463/23; 463/29; 463/40; 463/41

(58) Field of Classification Search ............ 463/23–25, 463/29–31, 40–42
See application file for complete search history.

(56) References Cited

U.S. PATENT DOCUMENTS

| | | | |
|---|---|---|---|
| 5,566,295 | A | 10/1996 | Cypher et al. |
| 5,710,894 | A | 1/1998 | Maulsby et al. |
| 5,838,317 | A | 11/1998 | Bolnick et al. |
| 5,872,844 | A | 2/1999 | Yacobi |
| 5,878,138 | A | 3/1999 | Yacobi |
| 6,119,229 | A * | 9/2000 | Martinez et al. ............... 726/28 |
| 6,165,072 | A * | 12/2000 | Davis et al. .................... 463/29 |
| 6,200,216 | B1 | 3/2001 | Peppel |
| 6,268,864 | B1 | 7/2001 | Chen et al. |
| 6,278,466 | B1 | 8/2001 | Chen |
| 6,304,259 | B1 | 10/2001 | DeStefano |
| 6,308,187 | B1 | 10/2001 | DeStefano |
| 6,873,336 | B1 | 3/2005 | Sailus et al. |
| 6,904,410 | B1 | 6/2005 | Weiss et al. |
| 6,979,267 | B2 * | 12/2005 | Leen et al. .................... 463/42 |
| 7,169,050 | B1 * | 1/2007 | Tyler .............................. 463/42 |
| 7,254,785 | B2 | 8/2007 | Reed |
| 7,275,987 | B2 | 10/2007 | Shimakawa et al. |
| 2001/0044339 | A1 * | 11/2001 | Cordero et al. ............... 463/42 |
| 2002/0022516 | A1 | 2/2002 | Forden |
| 2002/0142847 | A1 | 10/2002 | Thompson et al. |
| 2003/0045359 | A1 * | 3/2003 | Leen et al. .................... 463/42 |
| 2003/0216962 | A1 * | 11/2003 | Heller et al. .................. 705/14 |
| 2004/0002380 | A1 | 1/2004 | Brosnan et al. |
| 2004/0078572 | A1 * | 4/2004 | Pearson et al. .............. 713/170 |
| 2004/0137975 | A1 | 7/2004 | Yamada et al. |
| 2004/0242321 | A1 * | 12/2004 | Overton ........................ 463/29 |

OTHER PUBLICATIONS

Yan, Jianxin J. 'Security Issues in Online Games'. The Electronic Library, 2002; No. 20, vol. 2. pp. 125-133,177. [online] [retrieved Mar. 22, 2005] <URL:http://proquest.umi.com/pqdweb?did=208466111&sid=1&Fmt=3&clientId=19649&RQT=309&VName=PQD>.*

Smed, Jouni. 'Aspects of Networking in Multiplayer Computer Games'. The Electronic Library, 2002; No. 20. vol. 2. pp. 87-97. [online] [retrieved Mar. 22, 2005] <URL:http://proquest.umi.com/pqdweb?did=208459961&sid=2&Fmt=4&clientId=19649&RQT=309&VName=PQD>.*

(Continued)

*Primary Examiner*—Scott E Jones
*Assistant Examiner*—Milap Shah
(74) *Attorney, Agent, or Firm*—Lee & Hayes, PLLC (57) ABSTRACT

A player-exploitable game condition is monitored within a game. In certain versions, the play of certain players can be monitored, logged, and then examined. In one version, the monitoring includes comparing some quantifiable player activity against some threshold value. In one version, the monitoring is based on the rate at whish the player is acquiring virtual property.

24 Claims, 5 Drawing Sheets

OTHER PUBLICATIONS

Pritchard, Matt. 'Internet Cheating: How to Hurt Hackers'. Game Developer, Jun. 2002. vol. 7. Issue 6. pp. 28-40. [online] [retrieved Mar. 22, 2005] <URL:http://proquest.umi.com/pqdweb?did=53637433&sid=3&Fmt=4&clientId=19649&RQT=309&VName=PQD>.*

Kee, Edward. 'Cheating in Multi-player Gaming'. New Straits Times, Kuala Lumpur, Jun. 23, 2003. p. 25. [online] [retrieved on Mar. 22, 2005] <URL:http://proquest.umi.com/pqdweb?did=53637433&sid=3&Fmt=4&clientId=19649&RQT=309&VName=PQD>.*

"How Does VAC/VSM Work?" CSH-Network. [online] [retrieved on May 9, 2006] <URL: http://mirc-scrips.de/pn/html/modules.php?op=modload&name=FAQ&file=index&myfaq=yes&id_cat=9>.*

Gasior, Geoff. "Valve Bans Online Cheaters". The Tech Report. [online] [retrieved on May 9, 2006] <URL:http://techreport.com/news_reply.x/4010>. Dated Aug. 26, 2002.*

Gibson, Steve. "CS Cheaters Beware". ShackNews. [online] [retrieved on May 9, 2006] <URL:http://www.shacknews.com/onearticle.x/21540>. Dated Jul. 16, 2002.*

"Online Cheaters Face Games Ban". BBC News. [online] [retrieved on May 9, 2006] <URL:http://news.bbc.co.uk/1/hi/technology/2221335.stm>. Dated Aug. 29, 2002.*

"Cheating in Counter-Strike" Wikipedia, The Free Encyclopedia. [online] [retrieved on Dec. 20, 2006] <URL:http://en.wikipedia.org/wiki/Cheating_in_counter-strike>. Dated 1999-2006.*

"The Valve Anti-Cheating Module". Counter-Strike: The Official Counter-Strike Sever Admin Resource. [online] [retrieved on May 9, 2006] <URL:http://server.counter-strike.net/server.php?cmd=VAC>.*

"Valve Anti-Cheat". Wikipedia, The Free Encyclopedia. [online] [retrieved on Dec. 20, 2006] <URL:http://en.wikipedia.org/wiki/Valve_Anti-Cheat>.*

"Counter-Strike". Wikipedia, The Free Encyclopedia. [online] [retrieved on Dec. 13, 2006] <URL:http://en.wikipedia.org/Counter-Strike> Counter-Strike Dated Jun. 19, 1999.*

"VAC Security Module Updated Again". My-CS.com, Counter-Strike News, Maps, etc. [online] [retrieved on Aug. 30, 2002] <URL:http://www.my-cs.com/main.cfm>. Dated Aug. 22, 2002.*

"HLGuard" UnitedAdmins.com [online] [retrieved on Jul. 16, 2002] <URL:http//www.unitedamins.com/HLGuard.aspx> Dated 2002.*

"CSGuard" UnitedAdmins.com [online] [retrieved on Jul. 16, 2002] <URL:http://www.unitedamins.com/CSGuard.aspx> Dated 2002.*

"Motor City Online", retrieved on Aug. 1, 2006, at <<http:en.wikipedia.org/wiki/Motor_City_Online>>, Ea Games, Oct. 10, 2001, pp. 1-15.

"Seven Kingdoms II: The Fryhtan Wars", retrieved on Jul. 31, 2006, at <<http://en.wikipedia.org/wiki/Seven_Kingdoms II: The Fryhtan_Wars>>, Ubisoft, Jul. 1999, pp. 1-12.

* cited by examiner

METHODS AND SYSTEMS FOR MONITORING A GAME TO DETERMINE A PLAYER-EXPLOITABLE GAME CONDITION

TECHNICAL FIELD

Certain embodiments of this invention relate to games, and more particularly to game monitoring against cheaters and the like.

BACKGROUND

Massively multiplayer online games often include player-exploitable game conditions. Such player-exploitable game conditions can be exploited by cheating players to give them an unfair advantage while playing the game. Other players who are playing fairly may become discouraged from playing because of the unfair advantage provided for the relatively few cheating players. Examples of player-exploitable game conditions are based on the game environment, the scoring, and/or money keeping of the game, and other conditions.

In a given game, if one "cheating" player continuously exercises such an unfair advantage against other players, other players may be deterred from continuing to play that game. Certain very popular games have lost a considerable percentage of their followings because of the inability of the game developers and operators to reliably detect and control cheating players. The acceptance of such games often depends on how well the play by such cheaters is monitored or policed.

For specific games to be accepted and/or continue to be accepted, it is important to provide a mechanism to monitor against such exploitation of player-exploitable game conditions which provide an unfair advantage to a given player.

SUMMARY

This disclosure relates to games. In one version, a player-exploitable game condition is monitored within a game. In certain versions, the play of certain players can be monitored, logged, and then examined. In one version, the monitoring includes comparing some quantifiable player activity against some threshold value. In one version, the monitoring is based on the rate at which the player is acquiring virtual property.

BRIEF DESCRIPTION OF THE DRAWINGS

The same numbers are used throughout the drawings to reference like features and components.

DETAILED DESCRIPTION

This disclosure provides a method to detect cheating in online games. In many PC and console games, particularly role playing games (RPGs) and Massively Multiplayer Online Games (MMPOG), monitoring thresholds are set for certain numerical values in the game (e.g., amount of currency collected within a certain time or number of monsters defeated within a certain time). One assumption is that for a player to exceed one of these monitoring thresholds to score exceptionally well, the player is likely either exceptionally lucky, exceptionally skilled, cheating, or a combination thereof.

This disclosure provides a variety of mechanisms by which the play of certain players can be "monitored" or "policed" (these two terms are considered synonymous for purpose of this disclosure) to initially determine whether a player who is scoring very well or accruing many in-game objects quickly is doing so honestly or cheating. The monitoring protects other players who are playing honestly against cheaters.

Many cheaters as described in this disclosure are exploiting a "player-exploitable game condition" in the game. In this disclosure, the term "player-exploitable game conditions" describes a programming condition, situation, and/or aberration from a standard game and player that would give a cheating party an advantage over an honest player. Player-exploitable game conditions may result from the game itself and/or players of the game.

It is understood by the gaming community in general that a player who is cheating can unfairly accrue an exceptionally high score or a large number of virtual objects very quickly. In certain instances, a player can exploit certain types of player-exploitable game conditions even when they are not playing the game as well as when they are playing the game. A variety of types of player-exploitable game conditions are described in this disclosure. These player-exploitable game conditions are intended to be illustrative in nature and not limiting in scope since they often relate to peculiarities of a particular game.

Many aspects of the present disclosure relate to detecting when a certain threshold that may indicate a particular player may be cheating has been exceeded. The threshold may be included as a portion of a computer program associated with the game (e.g., a server that runs the game). Detailed logging can be initiated for particular player(s) when the threshold is exceeded in certain embodiments. Such logging provides an indication of the type of play by the monitored player. In certain versions, a notification can be sent to the system administrator to allow the system administrator to view the play (the inputs) of the monitored player to determine whether the player is cheating.

Figure 1:
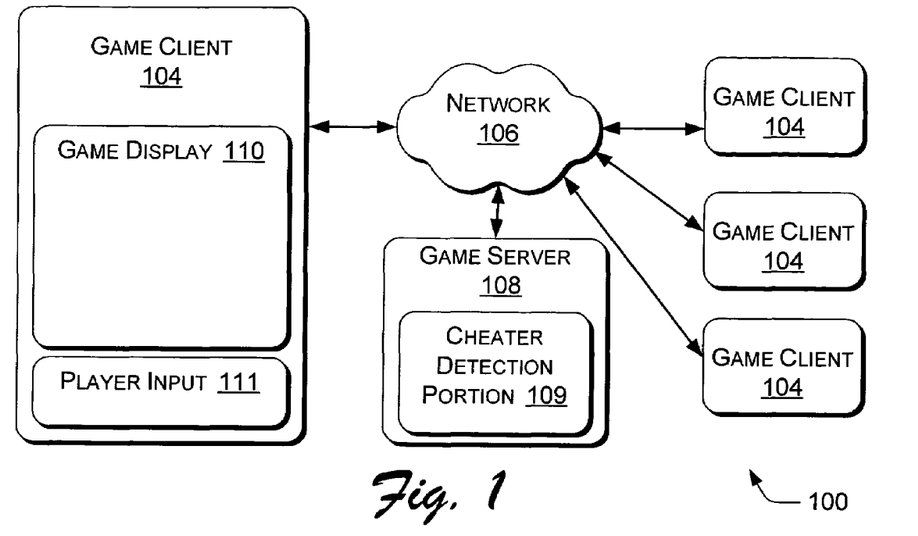
FIG. 1 is a block diagram of an exemplary game system.

FIG. 1 shows one embodiment of a game system 100. The game system is configured to play such games as RPGs and MMORPGs. The game system 100 is envisioned to run on a computer environment (that may including a variety of network or stand-alone configurations) of a type that may also be used for computing, word processing, data storage, and those other activities to which computers have been applied. While the embodiment of game system 100 as shown in FIG. 1 is described as being applied to a networked computer system, it is to be understood that the game system can also be applied to stand-alone computer systems. While it is likely that most RPGs (especially the more complex and popular versions) will be played on a networked configuration, it is also possible to run these games on stand-alone computer systems.

One version of the game system 100 includes a plurality of game clients 104 (one of which is shown in exemplary expanded view), a network 106, and at least one game server 108. Each game client 104 is computer-based, and communicates via the network 106 to the game server 108. The network 106 can include, for example, the Internet, corporate intranets, Local Area Networks (LAN), Wide Area Networks (WAN), wired network portions, wireless network portions, and any other desired network configuration.

In one version, the game server 108 includes a cheater detection portion 109. The cheater detection portion 109 "monitors" or "polices" players at the game clients 104 against cheating by players. The game server 108 can include a single computer configured as a personal computer, a mainframe, a laptop, a server computer, and so forth.

Alternatively, a large number of computers can be provided (for example on a "server farm" which is not shown) that are interconnected to appear to the players playing on the game client 104 that the plurality of computers forming the game server 108 act as a single extremely large computer. A group of game servers 108 located at such a server farm may be devoted to a single game, or alternatively any server may be shared to provide the computing resources for another game(s).

In games such as RPGs and/or MMPOGs, much of the processing and data maintained relating to the game occurs within the game sever 108. The game server 108 therefore makes many of the decisions relating to the game system 100. Using this configuration, many characters controlled by different players can interact with each other in the same game. Therefore, multiple players can view and interact with other players within the same game that are each providing input from different game clients 104. In larger game systems, hundreds or thousands of players can be playing the game simultaneously. In many versions, the game server 108 performs most of the processing associated with the game system 100 (i.e., the actions and decisions associated with the game are actually performed primarily at the game server 108).

The game server 108 handles the processing and data manipulation associated with complex games because it can communicate concurrently with a large number of game clients 104 at any given time, each of the game clients receiving input from and sending output to the game server. Within a given game being played by the game system, such characters as monsters, villains, vendors, etc. (that are part of the game) may continue to act with whichever player is participating in the game. The characters embodied by the players may enter and leave the game being played on the game system 100 simply by signing on and off their respective game clients 104.

Each game client 104 provides input from one or more players, and displays the output to be displayed to that player. As shown in FIG. 1, each game client 104 includes a game display 110 and a player input 111. Examples of such a player input 111 include, but are not limited to, mice, keyboards, joysticks, menus, microphones, and other known computer input devices by which the player may input text, numbers, graphics, audible commands or comments, and the like into the game system 100, and which can be processed and/or stored in the form of data.

This disclosure provides a mechanism by which one or more numerical thresholds can be applied to monitor certain parameters within a game. When a monitoring threshold is crossed by a player, in one embodiment the server will initiate detailed logging of that particular player. A developer can program threshold code in a manner that the level of the thresholds can be modified very quickly (e.g., in real time). Examples of relevant information parameters that can be provided with thresholds include, but are not limited to: monsters killed, players killed, experience level, inventory, and currency accrued. The thresholds can be added to relevant parameter functions in the source code within the game. Multiple thresholds can be set for different parameters within the same game. In different embodiments, the thresholds can be modified remotely as well as in real time.

When, during a game, a player obtains virtual object(s) such as currency (e.g., by looting a virtual monster corpse), a computer-program function can be called to potentially profile this information. The rate at which the virtual objects are acquired can be monitored and compared with a monitoring threshold. The threshold could reside in a database such that these monitoring threshold values can be modified in real time by the system operator if it is determined that another value is more suitable for the monitoring level. The profile of a particular game can be configured or modified to reduce the number of false positives.

Figure 2:
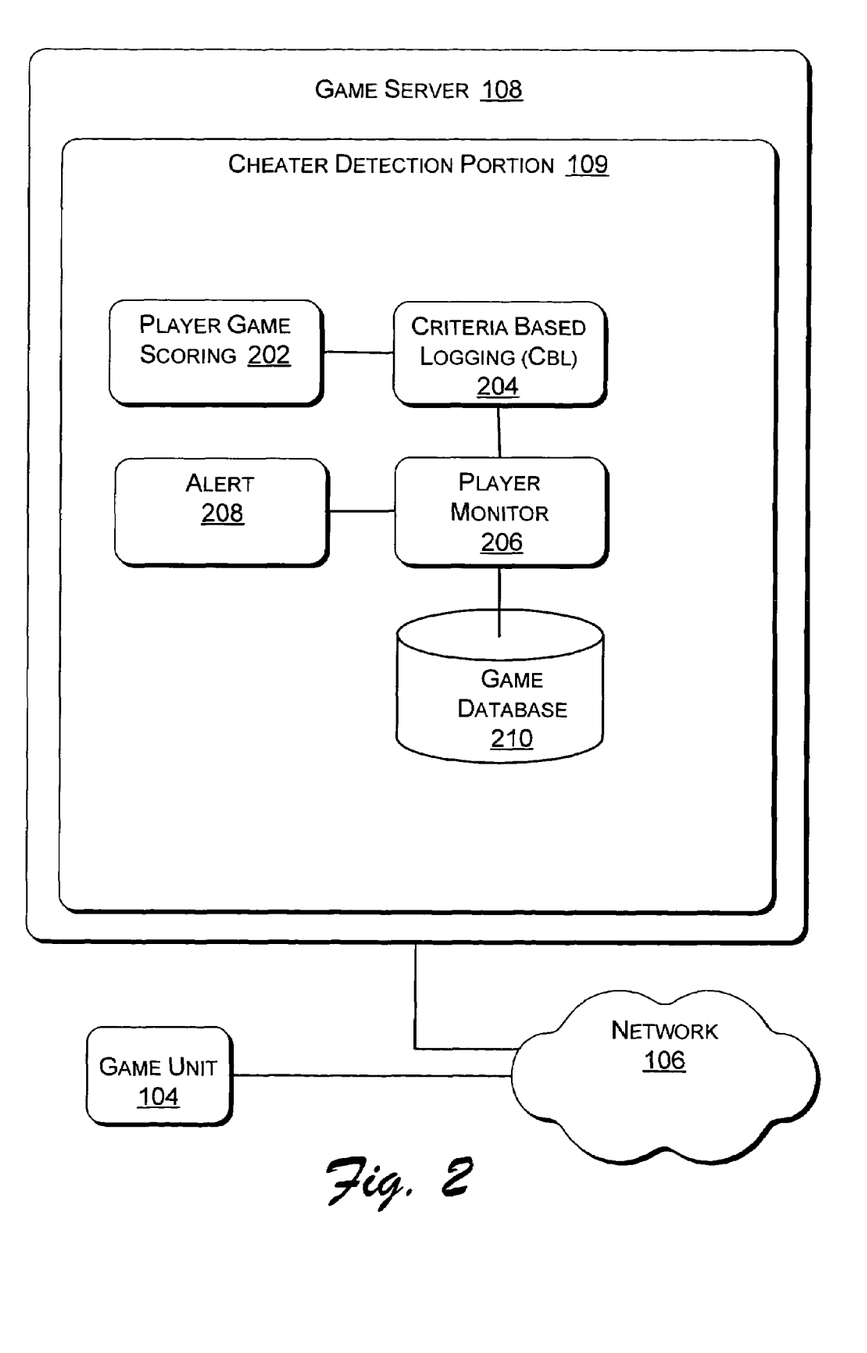
FIG. 2 is a block diagram of an exemplary game server of the game system shown in FIG. 1.

FIG. 2 shows a block diagram of one detailed version of the game server 108 as shown in FIG. 1. The game server includes a cheater detection portion 109. The cheater detection portion 109 monitors the game being played. One embodiment of the cheater detection portion 109 includes a player game scoring portion 202, a criteria based logging (CBL) portion 204, a player monitor 206, an alert portion 208, and a game database 210. In one version, the player game scoring portion 202 keeps a record (in the form of data) of how well each player is performing. In many of these games, the scoring of each player is associated with the "wealth" such as "gold" that they have accrued. As such, the player game scoring portion 202 may be referred to as a "gold collector".

The player monitor 206 and the CBL portion 204 can be associated with a record (log) of the players associated with each game. Individual players of many of the types of games described by this disclosure have been playing the same game over a span of a matter of years. In certain versions, the CBL portion 204 can log the scores and virtual objects of a particular player over an extended duration (e.g., years) depending on the type of game and the type of monitoring being performed.

One embodiment of the player monitor 206 determines whether (based on such factors as a particular player's score or accrual rate of virtual objects) the player is likely to be cheating based on the state of the CBL portion 204. Once the player monitor 206 determines that the player is cheating, the alert portion 208 can provide an alert to the game server 108 of the game client 104 that a player is cheating. Such warnings can optionally be transferred as an aural, written, or visible warning to the potentially offending player. Alternatively, such warnings can be provided to trigger the operation of the logging portion to log the play of that player.

Such warnings or alerts from the player monitor may range from an indication to the player that their play is being monitored, their permission to play the game is being suspended or permanently terminated, to limiting the players ability to gain access to the player-exploitable game condition that they are exploiting to cheat, or other such penalties. Such warnings or alerts can also optionally be transferred to a system administrator or other individual(s) responsible for managing the game.

Within different embodiments of this disclosure, it is to be understood that different configurations can exist between the monitor portion (e.g., the player monitor 206 as shown in FIG. 2) and the logging portion (e.g., the CBL portion 204 as shown in FIG. 2). In certain embodiments, the logging portion may be reduced, removed, and/or integrated into the monitor portion. For instance, in certain instances, once it is determined that a particular player is potentially cheating, the monitoring portion may contain sufficient data that can be analyzed to determine whether the player is actually cheating.

In addition, the logging portion may be operated following, prior to, concurrently with, or some combination with the monitoring portion.

The game database 210 stores data and processes associated with the player monitor 206 in a manner that provides for, and allows for, the operation of the game portion. In one version, the game database 210 maintains alerts provided by the player monitor 206 in order to indicate those players who habitually cheat.

Figure 3:
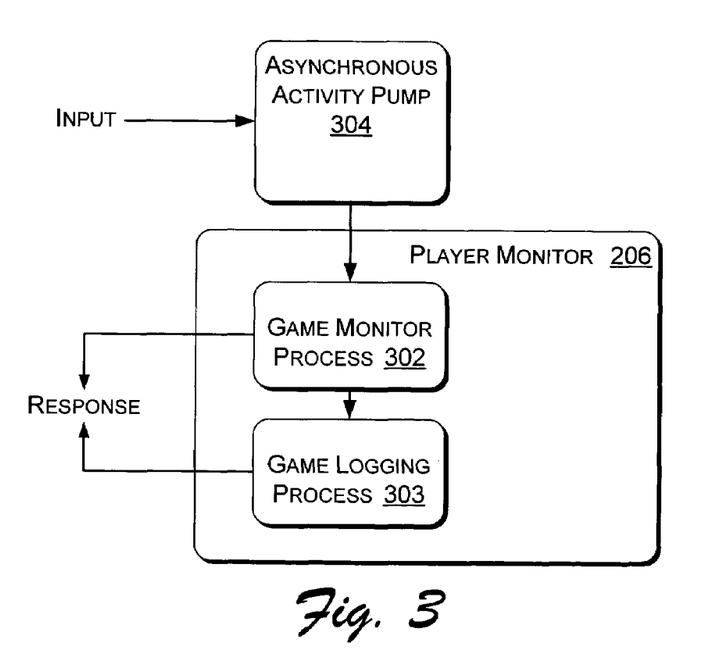
FIG. 3 is a block diagram of an exemplary player monitor of the game server shown in FIG. 2.

As shown in FIG. 3, one embodiment of the player monitor 206 includes a game monitor process 302 and an optional game logging process 303. The game monitor process 302 acts to determine whether actions by certain players are reaching a threshold value that may be viewed as cheating. The optional game logging process 303 logs sufficient data about a potential cheating player's activities to determine whether that player is cheating. All player's actions (or only certain player's actions) can be monitored depending on the configuration of the player monitor 206. The monitor portion and/or the logging portion can be operated all of the time or only at certain times. To provide the monitoring function, the game monitor process is in communication with an asynchronous activity pump 304.

In different embodiments, the asynchronous activity pump 304 may be located in either the game client 104, the network 106, the game server 108, or a combination thereof as shown in FIG. 1. Alternatively, recall that the game system 100 as shown in FIG. 1 may be configured as a stand-alone computer that can also contain the asynchronous activity pump 304. The asynchronous activity pump 304 acts to provide the desired data relating to the play of at least certain players to the game monitor process 302 (which the game monitor process uses to determine whether one or more players are cheating). For example, every time the user acquires gold or another item, every time the user kills a monster, every time the user accrues points for performing a task, and so forth, asynchronous activity pump 304 notifies game monitor process 302 that such event occurred (e.g., the amount of gold acquired, the item acquired, the monster(s) killed, the points accrued, etc.).

When playing games, players typically accrue points by performing some task on the computer. For example: when a player kills a monster in certain games, they often obtain some type of in-game currency. The in-game property and/or currency is sometimes referred to as "gold". The game design indicates that a player who is playing according to the rules (in not exploiting any player-exploitable game conditions) should be able to amass property at a maximum rate over a prescribed duration. The rate at which property is amassed relates to the number of objects of virtual property obtained over a prescribed time.

One version of the CBL portion 204 is operationally associated with the player monitor 206 having monitoring code. A certain player may be "lucky" for a brief duration. However, if their luck extends continuously and/or if they are exceptionally lucky, then certain embodiments of the cheater detection portion 109 provide a mechanism by which their good luck could be monitored and examined (largely to protect other honest players and the game itself). The exact meanings of such terms as "luck", "cheat", "monitor", and "examine" as applied within this disclosure can vary from game to game.

The player monitor 206 may be viewed as a device that monitors if/when a player gains gold at a rate that is greater than the normal expected property accrual rate. While a player accruing virtual objects at a significantly greater rate than normal is not proof that the player is cheating, it is strong evidence thereof (especially if the abnormally high accrual rate extends over some prescribed duration).

When certain versions of the player monitor 206 are triggered, the player's tasks are logged. Such player tasks that are logged may include, but are not necessarily limited to, such criteria as location, monsters killed, objects gained, objects traded, etc. Any game data can be logged, and the specific game data logged can vary based on the desires of, for example, the game operator or game designer. This information that is logged in the CBL portion 204 is saved to the game database 210.

In one game scenario, assume that a player (or group of players) figures out a way to kill a powerful creature in one minute that would normally take 30 minutes to kill. Upon death, certain creatures normally drop a prescribed number of virtual objects such as pieces of gold. Assume further that the method of killing monsters is not within the normal rules of the game. This means that in a matter of a relatively few minutes (e.g., less than 10 in many instances) a player that can kill multiple monsters quickly will gain a very large amount of virtual objects of property in a relatively brief duration. In one embodiment of the game server 108, this action by the player will trigger the monitoring code within the player monitor 206.

Once the player monitor 206 is triggered, there are several mechanisms that the operators of the game can apply to the player that is suspected of cheating. These mechanisms can vary depending on the type of game and the game operator. The operators of the game can decide to do nothing except continue to monitor the cheating player, or may identify the player-exploitable game conditions and correct them so that the cheating cannot continue. The operators of the game can ban the player for a brief duration or a longer duration depending on the infraction. Since many of these games can continue for extended durations and many of the players are continuously associated with their game on a day-to-day basis, discontinuing a player's privileges may be a serious punishment.

In addition, the game operator can notify other players of the identities of the cheaters. Also, the game operators can notify the player that they have observed the cheating action, and the player is afforded an opportunity (e.g., by email) to explain their action. Also, the identity of the cheating player can be publicized to other players (either their player identity or their actual identity) based on the particulars of the game.

Two or more of these monitoring actions can also be performed in combination. The cheater detection portion 109 therefore allows system administrators to easily and automatically identify cheaters by monitoring a portion of the suspected cheater's playing techniques. The manner that the game operators deal with the individual cheaters can vary widely and is up to the game operators.

The game system 100 may be viewed as providing a version of data mining. Data mining may be considered as obtaining some generalized meaningful information from a large amount of data. Prior-art versions of data mining provide a less than desirable solution to this problem in which a large amount of data can be sifted to find the cheaters. Prior-art data mining demands that system administrators review a considerable amount of data generated by the game system 100 to find the cheaters. There is such a large amount of data associated with the game system 100 that searching for cheaters can represent a daunting task for system programmers.

In addition, such prior data mining techniques only offer part of the picture. Only a certain amount of information can be effectively logged in that the information is spread over a considerable time. Many game systems 100 are approaching a million players, thereby making detailed logging impractical. While data relating to a single player can be observed, there is simply too much data to provide meaningful monitoring results pertaining to many players. Even if data mining catches a cheating player, human intervention is still usually needed to manually monitor the cheater to locate the in-game exploit. The more focused the monitoring is able to identify the cheating activity, often the easier it is to prove cheating.

Thus, it can be seen that when a threshold is exceeded for any player within the game, detailed logging for that particular player is initiated. In addition, a notification can be sent to the system administrators. The thresholds can reside in an accessible and changeable memory storage location (such as a Structured Query Language (SQL) database or an .ini file) so that they can be changed in real-time to avoid false positives.

Figure 4:
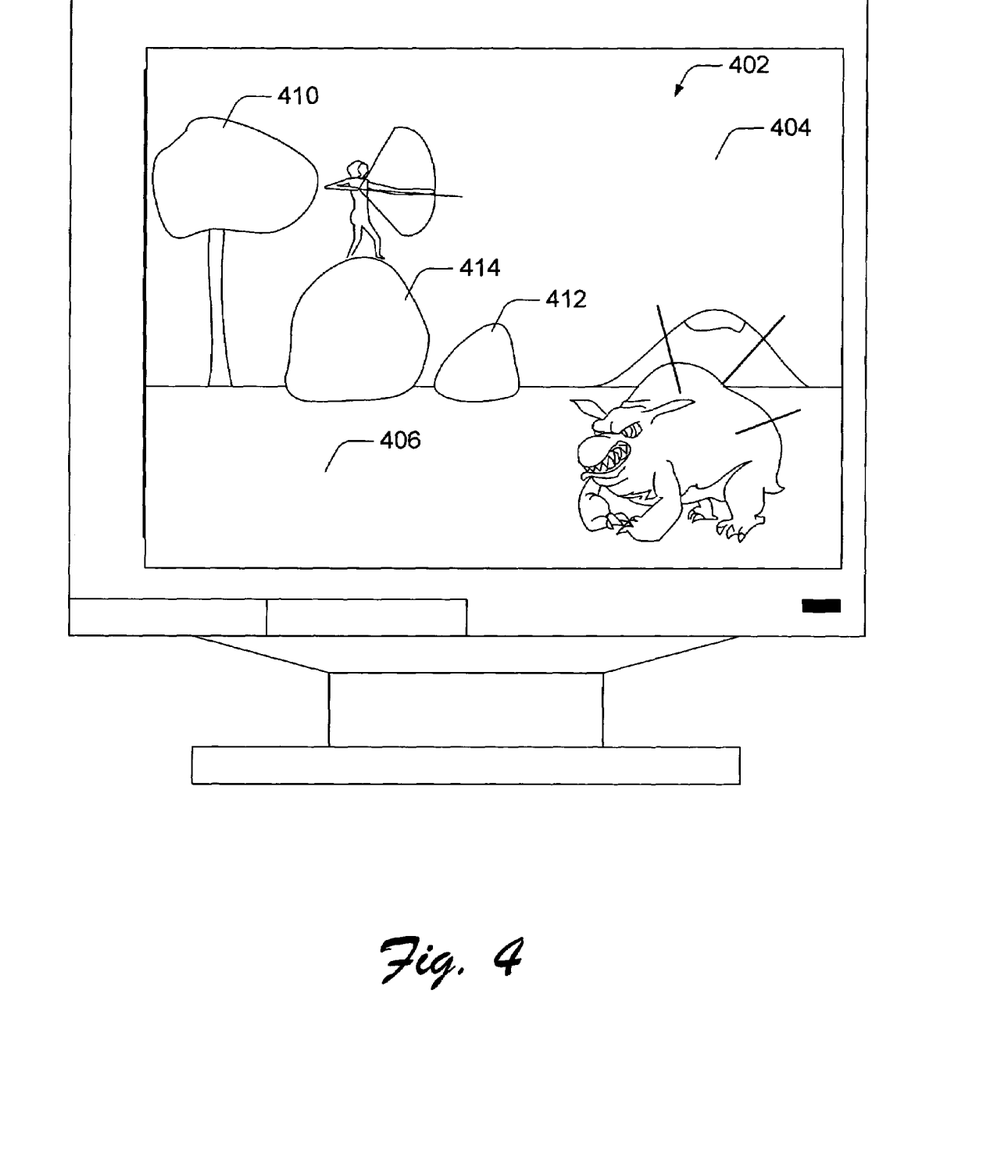
FIG. 4 is an exemplary user display such as provided by the player monitor shown in FIG. 3.

FIG. 4 shows one exemplary player-exploitable game condition scenario which a particular player may use to their advantage to "cheat". A virtual scene 402 (i.e., the virtual world in a game) is provided over a computer display 404 that provides a portion of a user interface 406. While the computer display 404 of FIG. 4 shows a computer such as personal computer or a laptop, it is envisioned that the game may be run on any other type of computer network system (e.g., that my include wireless and wired portions, Local Area Networks, Wide Area Networks, the Internet, of a corporate intranet) while remaining within the intended scope of the present disclosure.

The virtual scene 402 within the computer display covers a small portion of a game environment. The game environment may encompass thousands of virtual square miles in certain games. As such, it becomes important for game designers and artists to use computer generated graphical techniques to describe a virtual environment that covers a considerable amount of area (e.g., in the hundreds or thousands of square miles of virtual space). For instance, as shown in FIG. 4, an illustrative but not limiting virtual scene 402 includes a sky 404, a ground portion 406, a tree 410, a first rock 412, and a second rock 414.

To provide a cost-effective mechanism to produce the virtual scene 402, a computer artist will use a "broad brush" to cover the large amount of area that corresponds to the sky 404, the ground portion 406, and so forth. Such broad-brush techniques may include, for example, a wide brush that the computer artist can apply to a large area. Alternatively, some menu-driven or textual mechanism can be provided to apply a brush to a large given area. For example, a rule that may be applied to virtual scene 402 in a game is that all areas on the screen that are rendered above a horizon but are not obscured or hidden by a tree, a mountain 420, the rocks 412, 414, etc. will appear in the color selected for the sky. The color selected for the sky may be selected by the user in certain embodiments (e.g., to simulate sunset, mid day, a rainy day, etc.). The terrain tools have in certain prior-art game configurations been used to generate thousands of square kilometers of virtual terrain.

Providing features such as the trees 410 and the rocks 412, 414 on large areas of the ground portion 406 often makes the game more interesting. For example, it may be desirable to provide trees 410, rocks 412 and 414, buildings (not shown), and the like throughout virtual scene 402 to make the game more similar to the actual world. For reasons similar to why it takes a long time to color large portions of the virtual world as described in this disclosure, landscaping large regions of the virtual scene 402 with virtual objects such as rocks, trees, etc. would take the game artist and/or the game designer an extensive period, and be cost ineffective especially for large-scale games.

Computer techniques can also be used in many embodiments of games to generate and space virtual objects (rocks, trees, buildings, etc.) throughout the virtual scene 402. In certain embodiments of games, the computer environment uses randomizers to determine where to position the various virtual objects so that the objects are positioned approximately randomly in the environment.

One challenge with randomly placing objects, however is that sometimes the spacing between certain objects may be too small and result in unintended consequences. For example, in FIG. 4 multiple rocks may be positioned so close together that a player can climb on a second rock (e.g., rock 414) using a first adjacent rock (e.g., rock 412). The second rock could not be reached by the player without using the first rock, and it was intended by the game designer that a player not be able to climb on the second (higher) rock. However, because of the first rock being randomly placed adjacent to the second rock, the player can use the increased height afforded by climbing on the second rock to give them an unintended advantage in throwing a spear or shooting an arrow or gun in the game (e.g., monsters on the ground may not know how to handle the elevated player, or arrows may be configured in the game such that they cannot be shot sufficiently high in the air to strike an elevated player, and thus the player runs little if any risk of being injured while battling the monster). Thus, climbing up onto the second (higher) rock that is considerably higher than the ground plane may represent one version of player-exploitable game conditions that can exist within the game.

Once a cheating player has found such a perch in certain embodiments of games, there is very little incentive for them to return to the virtual ground plane and play fairly, unless the game somehow ensures that such cheating activity will be corrected. The player monitor 206 and alert portion 208 can be used by operators of certain versions of the game to protect against such cheaters.

Another illustrative example of a player-exploitable game condition that is not shown relates to scoring or pricing, and is referred to as a "rollover" player-exploitable game condition. The rollover embodiment of the player-exploitable game condition relies on the number of digits for scoring, purchasing, or other such game events being too low to describe all potential transactions. For example, assume that a scoring screen includes a shopping certificate for an identified player having a name identifier.

Each shopping certificate includes a virtual item text description and a total cost. In many game embodiments, the total cost of a particular virtual item is allocated a prescribed number of digits (which are typically represented by a number of binary bits). In certain instances, the actual cost of certain virtual items (particularly expensive ones) or groups of items can exceed the prescribed number of digits for the virtual item.

For example, assume that a car costs $399 within a game, and further assume that a player tries to buy three cars at the same time (having a combined cost of $1197). The correct cost in dollars (excluding the cents and ten cents digits) of these combined items requires four digits to describe. In those instances where the game is designed to use only three digits d1, d2, d3, in certain instances the total cost for the virtual items indicated within a game may roll-over to $197.

As such, a cheater can acquire an item of virtual property for little actual expense and/or effort. Many virtual items have been purchased by cheaters using such roll-over techniques.

While such roll-over player-exploitable game conditions have been described in this disclosure, it is emphasized that roll-over player-exploitable game conditions also apply in certain games to scoring and other aspects of the game. In one embodiment, a player can obtain higher scores than they actually earned honestly within the game using such a roll-over technique in those games that the number of digits in the score is less that the total number of digits that a player can score.

Buffer overruns can also cause unexpected pieces of code to execute, which can have unexpected results on the game. It is possible that a particular buffer overrun can cause conditions that players can exploit. For example, a player could exploit buffer overrun code in a manner that might cause the game server 108 to crash. The game server would recover, but would likely reinstate the user's data that was several minutes old. Therefore, and transaction data that occurred during the reinstatement period would be lost. Consider a scenario where an expensive virtual items was "sold" from one player to another player (both players are intending to defraud the game). The first defrauding players logs off which updates his character in the database of the game server 108. The second defrauding player engineers a system crash in the game server 108 that acts to reinstate an older version of the character, complete with an expensive virtual item that was sold between the crash and the reinstatement. A copy of the expensive virtual item might appear following the reinstatement at both the first defrauding player and the second defrauding player. This technique is referred to as "dupping", which is short for duplication. Widespread use of dupping would tend to erode the confidence of honest players in the game. The cheater detection portion 109 as described relative to FIG. 1 would likely detect many instances of dupping.

Exploiting each of the player-exploitable game conditions described in this disclosure (as well as other player-exploitable game conditions) gives certain players an unfair advantage by allowing them to advance within the game much faster than players who aren't exploiting said player-exploitable game conditions. While most game companies are diligent about locating and eliminating these player-exploitable game conditions, it is often very difficult for game designers, system managers, or others to locate all instances of the player-exploitable game conditions that provide one player an advantage considering the size of the virtual worlds in the game. Players who utilize these exploits often keep this information secret allowing them to take full advantage of these problems. By monitoring portions of the play of all players, and logging the play of some expected cheating players, the game operators allow the cheaters to locate the player-exploitable game conditions, but reduce the damage that the cheaters can cause by using the player-exploitable game conditions.

The player-exploitable game conditions as described herein are intended to be illustrative in nature and are not intended to be limiting in scope. One aspect that many of these player-exploitable game conditions share is that they allow one player to accrue points or virtual items at a rapid rate compared with other players who are not exploiting the player-exploitable game conditions. One aspect of the present disclosure provides a mechanism that monitors players who are scoring extremely well to determine whether their play is legitimate or they are cheating.

Figure 5:
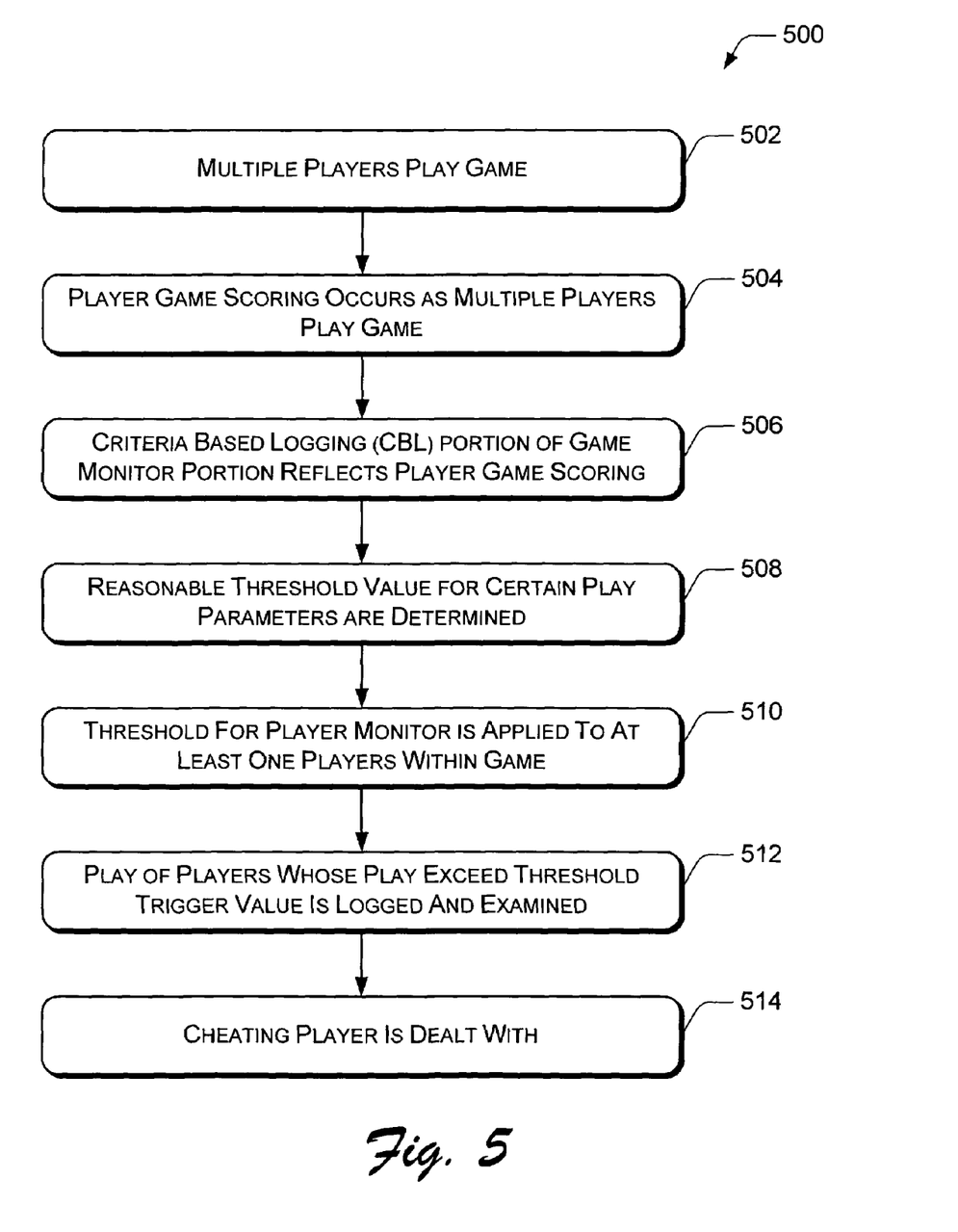
FIG. 5 is an exemplary cheater detection process such as can be applied by the game system of FIG. 1.
Figure 6:
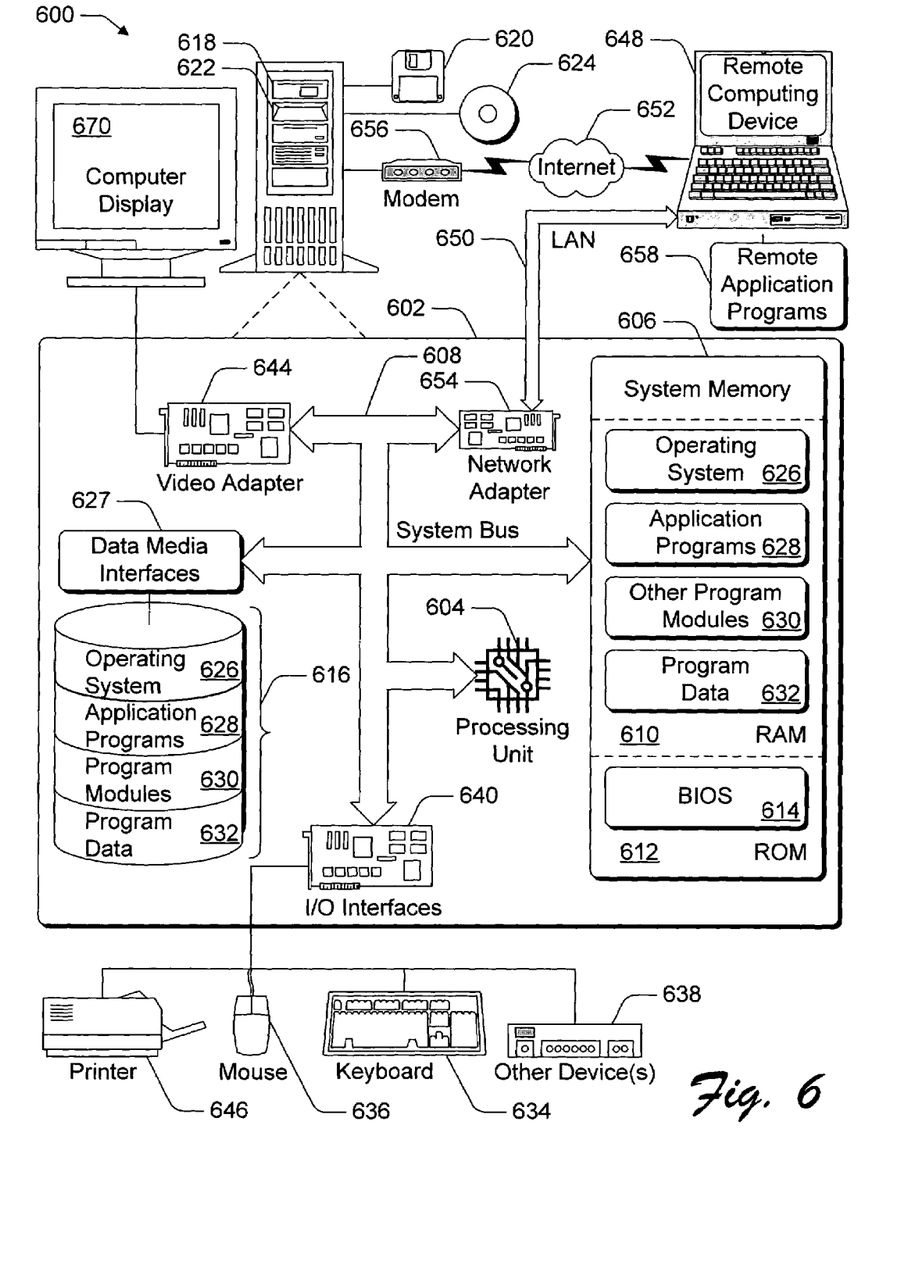
FIG. 6 is an exemplary computer environment on which the game system as shown in FIG. 1 can operate.

FIG. 5 shows one embodiment of a cheater detection process 500 that can be performed by the computer environment 600 as shown in FIG. 6 as applied to FIGS. 1 and 2. The cheater detection process 500 includes 502 in which multiple players play the game in the game system 100 as described relative to FIG. 1. In 504, the play of multiple players is scored during the game play. The scoring can include numeric scoring, rate of acquiring items of virtual property, and the like. The scoring is configured in a manner that it can be determined whether a particular player is acquiring an abnormally large number of points quickly. Though FIG. 5 describes scoring, similar concepts apply to purchase of game items within the game, etc.

In 506 of the cheater detection process 500, the criteria based logging portion 204 of the game monitor portion (e.g., the cheater detection portion 109) as shown in FIG. 2 is applied during the play of the game. In 508, reasonable threshold values for certain play parameters are determined based on values acquired by normal players during normal play. As such, the threshold values are exemplary and can be set, modified, and re-examined, and reset. Alternatively, the reasonable threshold values may be set by a game operator, game designer, or other individual.

In 510 of the cheater detection process 500, the threshold value for the player monitor is applied to at least one player within the game. If the play of any player exceeds the threshold value, then their play is logged in 512 within the criteria based logging portion 204 as shown in FIG. 2. Such logging of the play includes storing data inputs (e.g., keystrokes) compared to the state of the game at that particular time that can be used to indicate whether the player is cheating. As described relative to FIGS. 2 and 3, the logging activity is optional in certain versions of games. The logged play can thereupon be examined by, for example, a game operator to determine whether the play constitutes cheating. By having a detailed log of the cheater's actions, the game operator can not only punish the cheater accordingly, but also consider any player-exploitable game condition. If desired, the game operator can also correct, or work with the game designer to correct, the player-exploitable game condition. Such correction removes the player-exploitable game condition so that subsequently none of the players in the game can exploit that game condition.

In 514 of the cheater detection process 500, a player who is determined to be cheating is dealt with as described within this disclosure. Depending upon the game system 100 as shown in FIG. 1, the player-exploitable game condition can be modified and/or corrected to limit further exploitation. As such, cheater exploiting the player-exploitable game condition will provide a service to the game operators by locating these player-exploitable game condition, and thereupon allowing the game operators to correct certain player-exploitable game conditions. As more of these player-exploitable game conditions are found and removed, the trust of most players in those game that monitor cheaters will improve.

FIG. 6 illustrates an example of a suitable computer environment or network 600 that includes a user interface which can provide a game system 100 including a cheater detection portion. Similar resources may use the computer environment and the processes as described herein.

The computer environment 600 illustrated in FIG. 6 is a general computer environment, which can be used to implement the concept network techniques described herein. The computer environment 600 is only one example of a computer environment and is not intended to suggest any limitation as to the scope of use or functionality of the computer and network architectures. Neither should the computer environment 600 be interpreted as having any dependency or requirement relating to any one or combination of components illustrated in the exemplary computer environment 600.

The computer environment 600 includes a general-purpose computing device in the form of a computer 602. The computer 602 can be, for example, one or more of a stand alone computer, a networked computer, a mainframe computer, a PDA, a telephone, a microcomputer or microprocessor, or any other computer device that uses a processor in combination with a memory. The components of the computer 602 can include, but are not limited to, one or more processors or processing clients 604 (optionally including a cryptographic processor or co-processor), a system memory 606, and a system bus 608 that couples various system components including the processor 604 and the system memory 606. The computer environment 600 can include wired portions and wireless portions.

The system bus 608 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

The computer 602 can include a variety of computer readable media. Such media can be any available media that is accessible by the computer 602 and includes both volatile and non-volatile media, and removable and non-removable media.

The system memory 606 includes the computer readable media in the form of non-volatile memory such as read only memory (ROM) 612, and/or volatile memory such as random access memory (RAM) 610. A basic input/output system (BIOS) 614, containing the basic routines that help to transfer information between elements within the computer 602, such as during start-up, is stored in the ROM 612. The RAM 610 can contain data and/or program modules that are immediately accessible to, and/or presently operated on, by the processing client 604.

The computer 602 may also include other removable/non-removable, volatile/non-volatile computer storage media. By way of example, FIG. 9 illustrates a hard disk drive 615 for reading from and writing to a non-removable, non-volatile magnetic media (not shown), a magnetic disk drive 618 for reading from and writing to a removable, non-volatile magnetic disk 620 (e.g., a "floppy disk"), and an optical disk drive 622 for reading from and/or writing to a removable, non-volatile optical disk 624 such as a CD-ROM, DVD-ROM, or other optical media. The hard disk drive 615, magnetic disk drive 618, and optical disk drive 622 are each connected to the system bus 608 by one or more data media interfaces 627. Alternatively, the hard disk drive 615, magnetic disk drive 618, and optical disk drive 622 can be connected to the system bus 608 by one or more interfaces (not shown).

The disk drives and their associated computer-readable media provide non-volatile storage of computer readable instructions, control node data structures, program modules, and other data for the computer 602. Although the example illustrates a hard disk within the hard disk drive 615, a removable magnetic disk 620, and a non-volatile optical disk 624, it is to be appreciated that other types of the computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computer environment 600.

Any number of program modules can be stored on the hard disk contained in the hard disk drive 615, magnetic disk 620, non-volatile optical disk 624, ROM 612, and/or RAM 610, including by way of example, the OS 626, one or more application programs 628, other program modules 630, and program data 632. Each OS 626, one or more application programs 628, other program modules 630, and program data 632 (or some combination thereof) may implement all or part of the resident components that support the distributed file system.

A player can enter commands and information into the computer 602 via input devices such as a keyboard 634 and a pointing device 636 (e.g., a "mouse"). Other input devices 638 (not shown specifically) may include a microphone, joystick, game pad, satellite dish, serial port, scanner, and/or the like. These and other input devices are connected to the processing client 604 via input/output interfaces 640 that are coupled to the system bus 608, but may be connected by other interface and bus structures, such as a parallel port, game port, or a universal serial bus (USB).

A monitor, flat panel display, or other type of computer display 200 can also be connected to the system bus 608 via an interface, such as a video adapter 644. In addition to the computer display 200, other output peripheral devices can include components such as speakers (not shown) and a printer 646 which can be connected to the computer 602 via the input/output interfaces 640.

The computer 602 can operate in a networked environment using logical connections to one or more remote computers, such as a remote computer device 648. By way of example, the remote computer device 648 can be a personal computer, portable computer, a server, a router, a network computer, a peer device or other common network node, game console, and the like. The remote computer device 648 is illustrated as a portable computer that can include many or all of the elements and features described herein relative to the computer 602.

Logical connections between the computer 602 and the remote computer device 648 are depicted as a local area network (LAN) 650 and a general wide area network (WAN) 652. Such networking environments are commonplace in offices, enterprise-wide computer networks, intranets, and the Internet.

When implemented in a LAN networking environment, the computer 602 is connected to a local network 650 via a network interface or adapter 654. When implemented in a WAN networking environment, the computer 602 can includes a modem 656 or other means for establishing communications over the wide network 652. The modem 656, which can be internal or external to the computer 602, can be connected to the system bus 608 via the input/output interfaces 640 or other appropriate mechanisms. It is to be appreciated that the illustrated network connections are exemplary and that other means of establishing communication link(s) between the computers 602 and 648 can be employed.

In a networked environment, such as that illustrated with the computer environment 600, program modules depicted relative to the computer 602, or portions thereof, may be stored in a remote memory storage device. By way of example, remote application programs 658 reside on a memory device of the remote computer 648. For purposes of illustration, application programs and other executable program components such as the operating system are illustrated herein as discrete Web blocks, although it is recognized that such programs and components reside at various times in different storage components of the computer 602, and are executed by the data processor(s) of the computer 602. It will be appreciated that the network connections shown and described are exemplary and other means of establishing a communications link between the computers may be used.

Various modules and techniques may be described herein in the general context of the computer-executable instructions, such as program modules, executed by one or more computers or other devices. Generally, program modules include routines, programs, control objects 650, components, control node data structures 654, etc. that perform particular tasks or implement particular abstract data types. Often, the functionality of the program modules may be combined or distributed as desired in various embodiments.

An implementation of these modules and techniques may be stored on or transmitted across some form of the computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any process or technology for storage of information such as computer readable instructions, control node data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The term "communication media" includes, but is not limited to, computer readable instructions, control node data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Although the systems and methods have been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method implemented at a computing device, the method comprising:
   monitoring, by a game server comprising the computing device, one or more players in a game executed at the game server;
   determining, by the game server, based on the monitoring, one or more player-exploitable game conditions, the player-exploitable game conditions being programming conditions, situations, or aberrations produced within the game that give the one or more players an advantage against other players without the one or more players hacking the game, the determining comprising:
      setting a threshold against which the play of the one or more players is compared, the threshold being modified in real time on basis of a rate at which the scores and virtual objects of the one or more players are acquired during the game;
   triggering, by the game server, a player monitor for one or more potential cheating players whose rate of acquiring the scores and virtual objects is greater than the threshold, the player monitor logging game data about activities of the one or more potential cheating players in the game, the activities including locations, enemies injured or eliminated, or objects gained or traded for each of the one or more potential cheating players; and
   determining the one or more potential cheating players are cheating in the game based at least in part on the logged game data, and in an event the one or more potential cheating players are cheating in the game:
      identifying the player-exploitable game conditions of which the one or more potential cheating players are taking the advantage in the game.

2. The method of claim 1, wherein the monitoring is automatic.

3. The method of claim 1, wherein the monitoring checks for the one or more potential cheating players.

4. The method of claim 1, wherein a cheater detection portion performs the monitoring.

5. The method of claim 1, further comprising sending a notice to the one or more potential cheating players.

6. The method of claim 1, further comprising terminating the one or more potential cheating players' privileges for a prescribed duration.

7. The method of claim 1, further comprising sending a notice to players other than the one or more potential cheating players describing the activities of the one or more potential cheating players.

8. The method of claim 1, wherein one of the player-exploitable game conditions includes positioning the players at some location other than a ground plane within a virtual scene.

9. The method of claim 1, wherein one of the player-exploitable game conditions includes rollover of one of the players' score.

10. The method of claim 1, wherein one of the player-exploitable game conditions includes rollover of one of the players' expense.

11. An apparatus implemented at least in part by a computing device comprising:
    a processor;
    one or more computer readable media; and
    a computer program encoding a game including a cheater detection portion that identifies one or more player-exploitable game conditions and detects players who are exploiting at least one of said player-exploitable game conditions, the player-exploitable game conditions being programming conditions, situations, or aberrations produced within a game that give the players an advantage without the players hacking the game, the cheating detection portion comprising:
       a player game scoring portion configured to keep a record of how well the players are performing in the game;
       a player monitor portion configured to determine whether the players are likely to be cheating based on the record provided by the player game scoring portion, the determination being performed by comparing actual rate of acquiring scores by the players against a threshold;

a criteria based logging portion configured to log game data including scores and virtual objects of the potential players in the game over an extended duration, the game data being analyzed to identify the one or more player-exploitable game conditions in the game and detect the players who are exploiting the one or more player-exploitable game conditions; and an alert portion configured to transmit alert messages reporting the one or more player-exploitable game conditions and players who are exploiting the one or more player-exploitable game conditions.

12. The apparatus of claim 11, wherein the cheater detection portion includes an asynchronous activity pump.

13. The apparatus of claim 11, wherein the cheater detection portion is included as a portion of a network.

14. The apparatus of claim 11, wherein the cheater detection portion is included as a portion of a stand-alone computer system.

15. A method implemented at a computing device, the method comprising:

setting a threshold for a game, wherein the threshold is set based on a rate at which virtual property is acquired and the threshold is configured to be modified in real time;

monitoring, from a game server comprising the computing device, a game play of a plurality of players for one or more player-exploitable game conditions, the one or more player-exploitable game conditions comprising one or more of a rollover situation and a dupping situation in which one or more cheating players take an unfair advantage by exploiting such situation without hacking the game, wherein:

the rollover situation happens in the game where numbers of digits for scoring, purchasing or other game activities are too low to describe all potential transactions; and the dupping situation happens in the game where the one or more cheating players duplicate an item by exploiting buffer overrun code in a manner that causes the game server to crash and recover with user data reflecting game status of the one or more cheating players prior to the game server crash;

determining, from the game server, whether the threshold is exceeded for any of the players of the game;

logging the game play of the players whose play exceed the threshold to a computer storage media; and identifying the one or more player-exploitable game conditions and the one or more cheating players who exploit the player-exploitable game conditions based at least in part on the logged play, whereby the cheating players are dealt with to prevent from further occurrence.

16. The method of claim 15, further comprising changing the threshold when the game is being played.

17. The method of claim 15, wherein the threshold is configured to be reset.

18. The method of claim 15, further comprising punishing the one or more cheating players.

19. The method of claim 15, further comprising modifying the game based on the one or more cheating players.

20. A computer readable medium having computer executable instructions that, when executed by a processor of the game server, cause the processor to perform:

monitoring, from a game server, one or more players in a game;

determining, from the game server, based on the monitoring, one or more player-exploitable game conditions, the player-exploitable game conditions being programming conditions situations, or aberrations produced within the game that give the one or more players an advantage against other players without the one or more players hacking the game, the determining comprising:

setting a threshold against which a game play of the one or more players is compared, the threshold being modified in real time on basis of a rate at which scores and virtual objects of the one or more players are acquired during the game;

triggering, from the game server, a player monitor for each of one or more potential cheating players whose rate of acquiring the scores and virtual objects is greater than the threshold, the player monitor logging game data about activities of the one or more potential cheating players in the game, the activities including locations enemies injured or eliminated, or objects gained or traded for each of the one or more potential cheating players; and determining the one or more potential cheating players are cheating in the game based at least in part on the logged game data, and in an event the one or more potential cheating players are cheating in the game:

identifying the player-exploitable game conditions of which the one or more potential cheating player are taking the advantage in the game.

21. The computer readable medium having computer executable instructions of claim 20, wherein the determining the one or more potential cheating players are cheating is based in part on logging play of the one or more potential cheating players whose play exceeds the threshold.

22. The computer readable medium having computer executable instructions of claim 20, wherein the threshold is configured to be reset.

23. The computer readable medium having computer executable instructions of claim 20, wherein the computer executable instructions that, when executed by the processor of the game server, cause the processor to further perform punishing the one or more potential cheating players who are determined to be cheating in the game.

24. The computer readable medium having computer executable instructions of claim 20, wherein the computer executable instructions that, when executed by the processor of the game server, cause the processor to further perform modifying the game based on the one or more potential cheating players.

* * * * *